A. F. JOHNSON.
COMPUTING SCALE.
APPLICATION FILED APR. 29, 1909.
1,026,263.
Patented May 14, 1912.
3 SHEETS—SHEET 1.
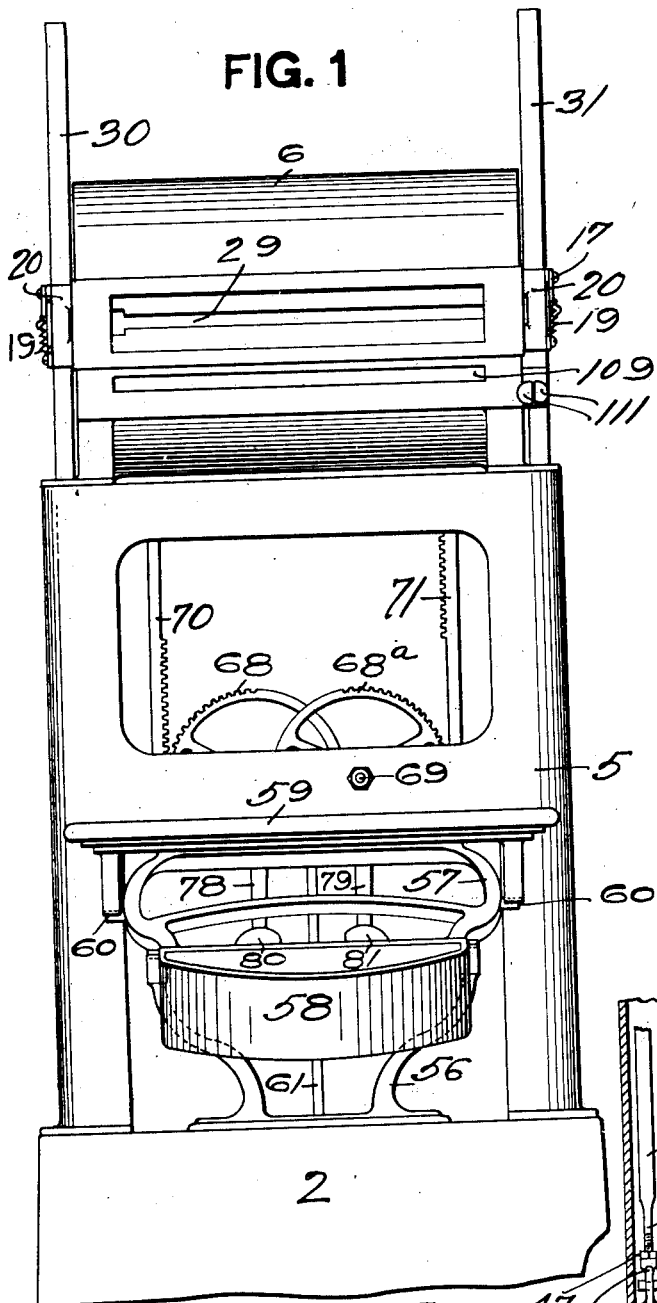
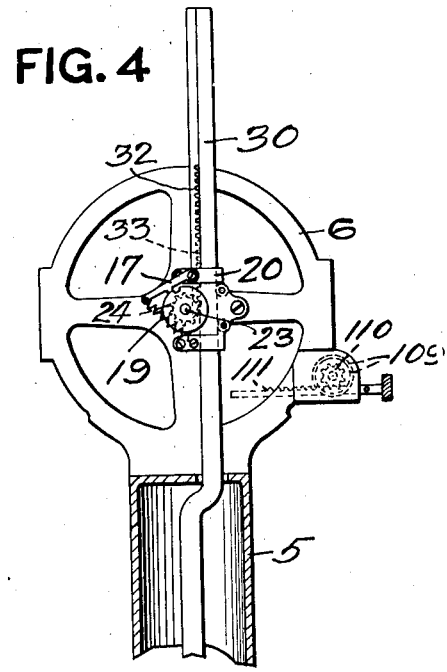
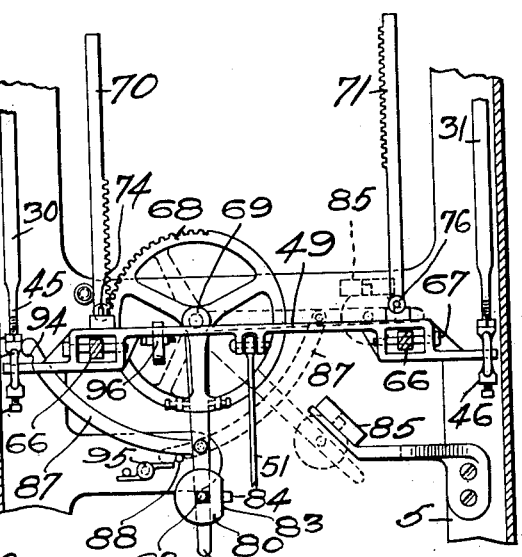
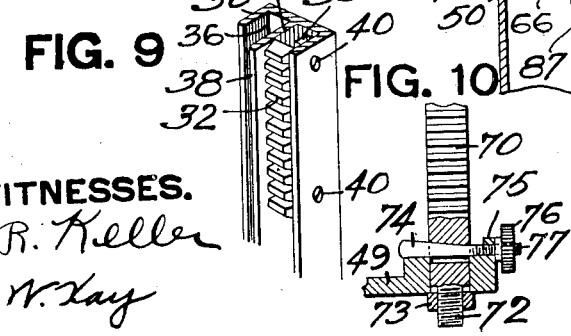
WITNESSES.
J. R. Keller
F. W. Kay
INVENTOR.
Albert F. Johnson
By Kay & Totten
attys

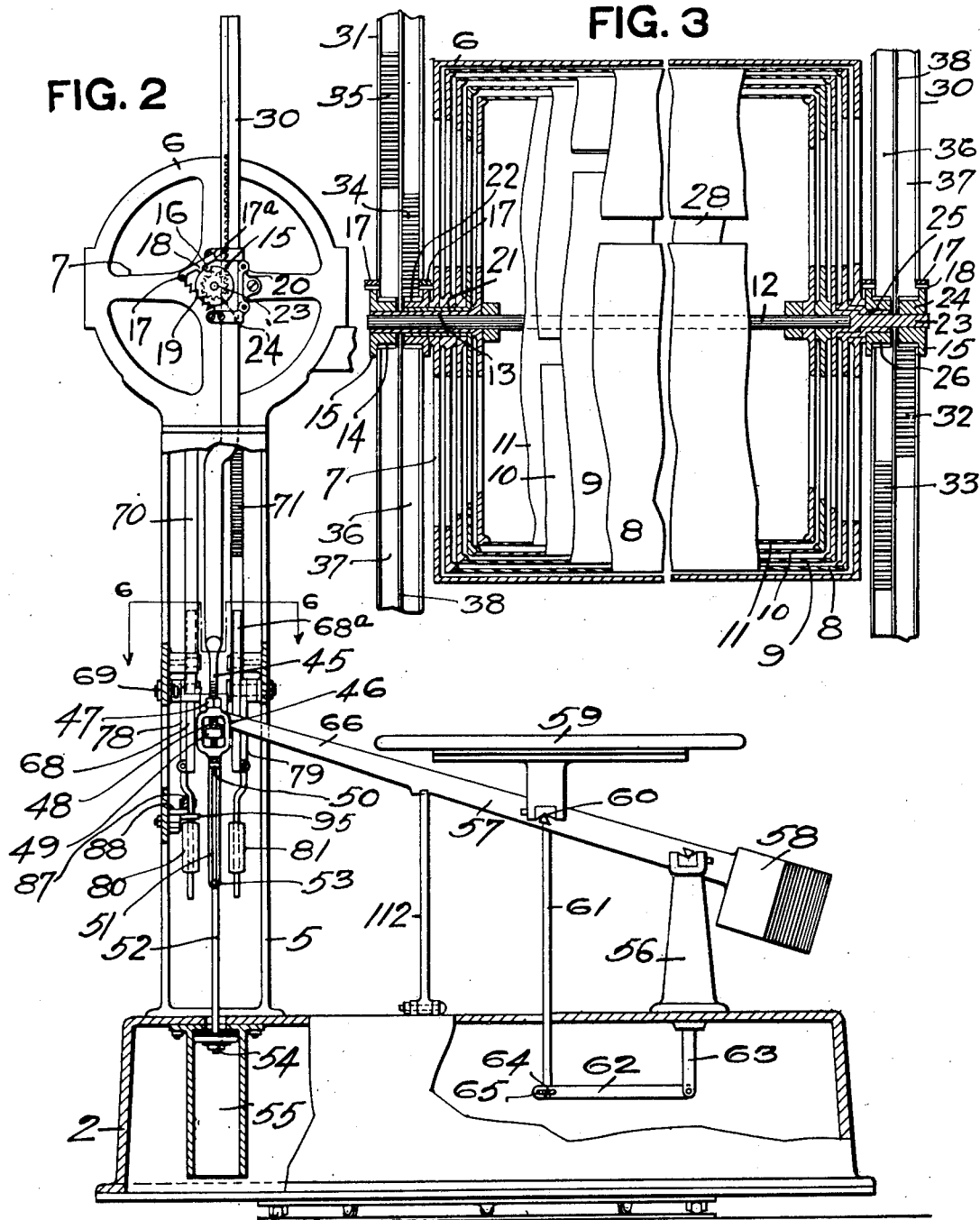

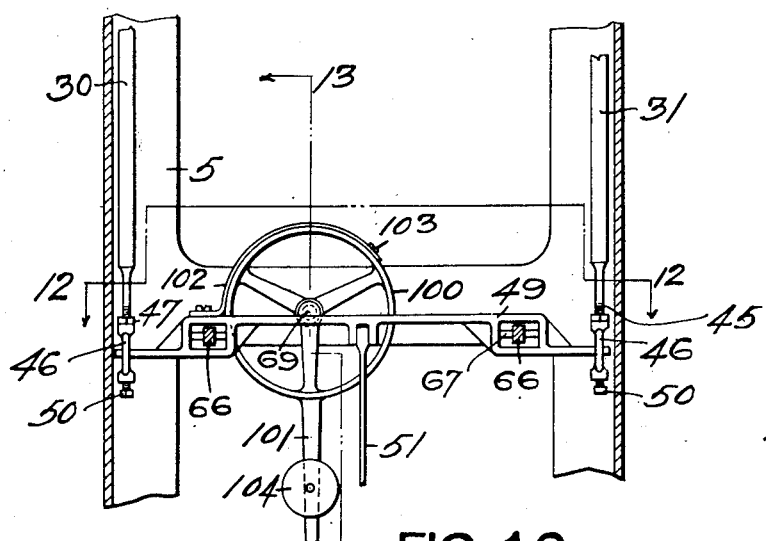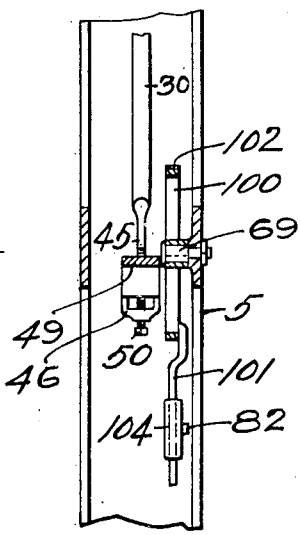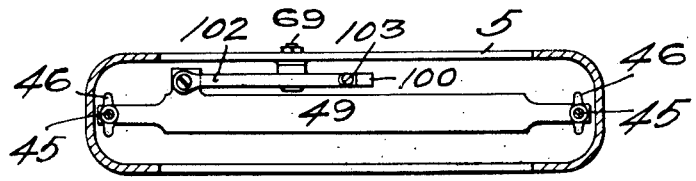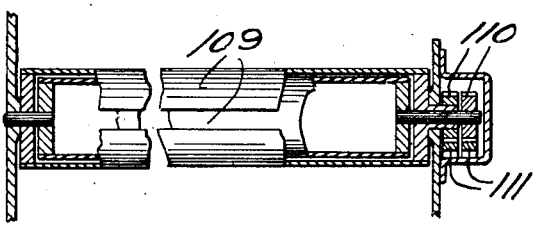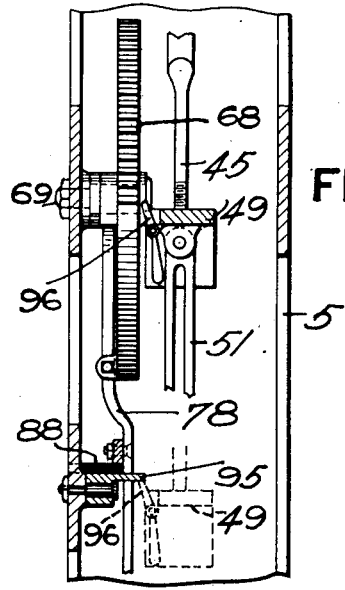

UNITED STATES PATENT OFFICE.

ALBERT F. JOHNSON, OF McKEESPORT, PENNSYLVANIA.

COMPUTING-SCALE.

1,026,266.   Specification of Letters Patent.   Patented May 14, 1912.

Application filed April 29, 1909. Serial No. 492,973.

*To all whom it may concern:*

Be it known that I, ALBERT F. JOHNSON, a resident of McKeesport, in the county of Allegheny and State of Pennsylvania, have invented a new and useful Improvement in Computing-Scales; and I do hereby declare the following to be a full, clear, and exact description thereof.

My invention relates to computing scales. The object of the invention is to improve scales of this character in a number of respects but more especially to provide for the use of two or more cylinders, the one within the other whereby the capacity of the scale is greatly increased, and the scale has a much wider range of use.

To these ends my invention comprises, generally stated, a computing scale having two or more computing cylinders, one within the other, and means for operating said cylinders in succession.

In the drawings Figure 1 is a front view in elevation of my improved scale; Fig. 2 is a side view with the casing partly broken away to show the interior; Fig. 3 is an enlarged central section in elevation of the computing cylinders; Fig. 4 is a side view of the upper portion of the scales showing the fraction rolls; Fig. 5 is a detail of the weight operating mechanism; Fig. 6 is a section on the line 6—6, Fig. 2; Fig. 7 is an enlarged detail of the weight releasing mechanism; Fig. 8 is a detail of the fraction roll; Figs. 9 and 10 are details of the rack bars; Fig. 11 is a modified form of the weight operating mechanism; Fig. 12 is a section on the line 12—12, Fig. 11; and Fig. 13 is a section on the line 13—13, Fig. 11.

I have illustrated my invention in connection with a simple form of counter scale for use in stores, although I wish it clearly understood that the invention is applicable for use in connection with truck or platform scales.

In the drawing the numeral 2 designates the base of the scale, said base being provided on the bottom with the rollers 3 which are adapted to rest on the plate 4 and move in guides therein for the purpose of turning the base around in any desired position.

Mounted on the base 2 is the hollow frame 5 which has at the upper end thereof the drum 6, said drum having the spider end-portions 7. Within the drum 6 are the cylinders 8, 9, 10 and 11. These cylinders are supported by the shaft 12 and the innermost cylinder 11 has the sleeve 13 which extends out through the openings in the cylinders 8, 9 and 10 and in the drum 6. Mounted on the outer end of the sleeve 13 is the pinion 14. This pinion 14 is provided with the flange 15, said flange having the notch 16 with which the tooth 18 on the pawl 17 is adapted to engage upon each revolution of said pinion 14. The pawl 17 is pivoted at 17ª to the bracket 20. A spring 19 is attached to the pawl 17 and to the bracket 20 on the drum 6. The cylinder 10 has the sleeve 21 which encircles the sleeve 13 and on the outer end of said sleeve is the pinion 22 corresponding to the pinion 14 and provided with a stop pawl mechanism, the same as that illustrated in connection with the pinion 14. The cylinder 9 has the extended hub-portion 23 which is reduced in size so as to receive a pinion 24 of the same diameter as the pinions 14 and 22. The cylinder 8 has the reduced sleeve portion 25 which encircles the extended hub-portion 23 of the cylinder 9 and a pinion 26 is mounted on the sleeve 25. These pinions 24 and 26 are provided with the pawl-mechanism similar to that illustrated in connection with the pinions 14 and 22. The cylinders 8, 9, 10 and 11 are provided with the slots 28 which are adapted to be brought into coincidence with each other and the drum 6 is provided with the slot 29 through which the figures on the cylinders are exposed and read. I have not deemed it necessary to illustrate the system of figures carried by the cylinders, as they may be varied to suit different uses to which the scales are to be applied.

The pinions 14, 22, 24 and 26 are engaged by racks on the rods 30 and 31. There are four of these racks 32, 33, 34 and 35. The rods 30 and 31 are provided with the ways or grooves 36 and 37 and the racks fit within said grooves. These rods are provided with the ribs 38 and the racks are provided with grooves 39. Set screws 40 engage the grooves 39 and prevent the outward movement of said racks. The racks are held at the proper height within the rod 30 and 31 by means of the screws 40. In this manner the racks are made adjustable, if desired. These racks are arranged at different heights with reference to each other in the rods 30 and 31. The racks 32 and 33 in the rod 30 being arranged so that when the rack 32 is in engagement with the pinion 24 of the cylinder 9, the rack 33 will be below and out of engagement with the pinion 26. In the same manner the racks 34 and 35 are so arranged that when the rack 34 is in engagement with the pinion 22 the rack 35 will be out of engagement with the pinion 14 and vice versa. From this construction it will be apparent that the cylinders are operated independently of each other by their individual racks, said racks operating in succession. The rack 33 engaging the pinion 26, or inner cylinder, first operates the outer cylinder 8 and when said cylinder has completed a revolution the rack bar 32 will come into engagement with the pinion 24 and rotate the cylinder 9 until it has made a complete revolution, whereupon the rack 34 will come into engagement with the pinion 22 and rotate the cylinder 10 until it has made a complete revolution, and finally the rack 35 will engage the pinion 14 and impart rotary movement to the innermost cylinder 11, or outer cylinder.

The rods 30 and 31 pass up through the guide-brackets 29 and extend down into the hollow frame 5. The lower ends of the rods 30 and 31 are reduced as at 45 to receive the turn-buckles 46. Lock-nuts 47 engage the reduced portions 45 of the rods 30 and 31 and the ends of said reduced portions are pointed or tapered as at 48 to engage the ends of the cross-bar 49 which passes through the turn-buckles 46. Set-screws 50 pass up through the lower ends of the turn-buckles and engage the lower face of the cross-bar 49 at the ends thereof. In this manner the rod 30 or 31 may be raised or lowered by turning the nuts 47, and the set-screws 50 may be adjusted to hold the cross-frame 49 in contact with said rods 30 and 31. At about the mid-portion of the cross-frame 41 is pivoted the slotted-link 51 and connected to said slotted-link is the rod 52, said rod having the pin 53 which is movable in said slotted-link 51. At the lower end of the rod 52 is the piston 54 which fits within the dash-pot 55 in the base 2.

Mounted on the base 2 is the pedestal 56 which forms the fulcrum for the tilting weighing-frame 57. This frame is provided with the weighted portion 58 at its outer end and mounted on said frame is the weighing-platform 59 which is mounted on the knife-edge lugs 60 on the frame 57. This platform 59 is held in a horizontal position by the rod 61 which passes down into the base 2 and is connected by the link 62 to the arm 63. The connection between the rod 61 and link 62 is made by the pin 64 on the rod 61 engaging the slot 65 in the link 62. The arms 66 of the weighing frame 57 are connected to the cross-bar 49 at each end thereof by means of bolts 67.

Wheels 68, 68ª are mounted on the studs 69 supported by the frame. A portion of the periphery of said wheels is toothed and said wheels are adapted to be engaged in succession by the rack-bars 70 and 71 carried by the cross-bar 49. These rack-bars 70 and 71 pass through openings in the cross-bar 49 and the lower ends of said bars are threaded, as at 72, to receive the lock-nuts 73. Wedges 74 pass through openings in the bars and through the lugs 75 on cross-bar 49. Nuts 76 engage the threaded ends 77 of the wedges. By this construction the rack-bars 70 and 71 may be adjusted when desired. Mounted on the studs 69 are the arms 78 and 79 to which the weights 80 and 81 are attached by set screws 82. The weight 80 has the flattened face 83 and projecting from said face is the lug 84. Resting on the stationary frame 50 is the weight 85 which is provided with the recess 86 with which the lug 84 on the weight 80 is adapted to engage and lift said weight 85 from the frame, as indicated in dotted lines Fig. 5, for the purpose fully hereinafter set forth.

A curved arm 87 is connected to the weighted arm 78 and said arm rides normally over the pin 88. This arm 87 is provided with the notch 94 which is adapted to engage said pin to lock the arm 78 in its horizontal position. A tripping pawl 95 is adapted to engage the ends of the curved arm 87, as shown in dotted lines, and said pawl is tripped by the finger 96 extending down from the cross-bar 49 and as the tilting weighing frame rises after the weight has been removed, the tripping pawl 95, being in the path of said finger, will be moved so as to lift the arm 87 from the pin 88 when the weighted arm 78 will drop back to its normal position, as indicated in Fig. 5.

In Figs. 11 and 12 I have illustrated a modified form of my invention in which I employ a band wheel 100 for operating the weighted arm 101. The wheel 100 has the band 102 secured thereto by screw 103. The opposite end of the band 102 is secured to the cross-bar 49 and by the downward movement of said cross-bar it is apparent that the wheel 100 will be rotated and the weighted arm 101 lifted. This modification is adapted for use where only two cylinders are employed as it is apparent that the cross-bar 49 can only be lowered to the extent of the length of the band 102. The weight 104 on the arm 101 may be similar to the weight 80 of the original construction and may be adapted to lift a weight carried by the frame.

I employ in connection with my improved scales the fractional roll 109 which is attached to the drum 6 and one of these fractional rolls is employed, one within the other, operated by the pinions 110 and one of which is connected up to each roll. The pinions are operated by the racks 111. These rolls are employed for calculating the fractional parts of a pound and may be conveniently used in connection with my improved scales, although they do not form an essential part thereof.

In order to hold the weighing frame against the jarring action which would occur where portions of the article to be weighed are introduced onto the platform 59 intermittently, I employ the strut 112 which is adapted to support the weighing frame until the material to be weighed has all been placed on the platform 59. When this has been done the strut 112 is lowered and the weighing frame permitted to descend. This strut 112 may be pivoted to the base and swung up and down into and out of operative position.

When my improved scales are in use the material to be weighed is placed upon the weighing platform 59 and the strut 112 is lowered whereupon the weighing frame 57 will descend. The weighing frame in its descent will carry down with it the cross-bar 49 and with it the rack-bars 30 and 31. The rack 33 will move in engagement with the pinion 26 and the outer or inner cylinder 8 will be rotated. If the capacity of the outer cylinder 8 is not sufficient to weigh and compute the material being weighed, the weighing frame 59 will descend until the rack 32 is brought into engagement with the pinion 24 which will then act to rotate the next cylinder 9. As the cross-bar 49 is carried down by the weighing frame, the rack bars 70 and 71 will likewise be lowered and the rack bar 70 will first rotate the toothed wheel 68. As this wheel rotates the arm 78 carrying the weight 80 will be lifted and the weight will move through the arc of a circle with the center of the wheel 68 as a center. The wheel 68 will rotate a certain distance, while the rack 33 is moving the outer cylinder 8 and when the rack 32 engages the pinion 24 to operate the cylinder 9 the weighted arm will be carried still farther around and when said rack 32 has almost passed the pinion 24 the weighted arm will be in its horizontal position. The weight 80 will come in contact with the weight 85 when the first cylinder has made a complete rotation and the lug 84 will enter the recess in said weight 85 and the further movement of the arm 78 will lift the weight 85 from the bracket or support. In this way I am able to employ a lighter weight in the end of weighted arm 78 and so make the scales more sensitive for weighing light objects. If the movement of the weighted arm from its vertical position to a position where it lifts the weight 85 will weigh an object of 25 pounds weight, it will be apparent that by lifting the further weight 85, the weighing capacity of the first two cylinders can be made to correspond to the combined weight of the weights 80 and 85. This weight 85 may vary in weight according to the capacity which it is desired to give to the first two cylinders. As the weighted arm 78 is raised the curved arm 87 will move in contact with the pin 88 and when said weighted arm has reached its limit of movement the notch 94 will engage the pin 88 and hold said weight in its raised position. When the weighted arm has reached this point the rack of the rack-bar 70 will have passed beyond the teeth of the wheel 68 and the further movement of said rack-bar will be with its plain face in contact with the plain face of the wheel 68. If the object to be weighed is of a weight greater than can be weighed by the rotation of the first two cylinders 8 and 9 and the weighing frame continues to descend after the weighted arm 78 has been locked in its horizontal position, the rack 34 will engage the pinion 22 and rotate the cylinder 10, the racks 32 and 33 having passed beyond the pinions 24 and 26. At this stage of the operation the rack-bar 71 will come in engagement with the wheel 68$^a$ and said wheel will be rotated and the weighted arm carried thereby lifted in the same manner as the weighted arm of the wheel 68. The rotation of the wheel 68$^a$ will continue until the rack 71 has engaged all the teeth of said wheel, whereupon the weighted arm of said wheel, will be raised to its utmost and the inmost cylinder 11 will have been rotated to its full extent and the scales have weighed and computed up to their utmost capacity When the object or material to be weighed is taken from the platform after being weighed and the price computed, the weighing platform 57 will rise and as the cross-bar 49 rises it will trip the pawl 95 and release the arm 78 just in time for the rack 70 to engage the wheel 68 and return it to its normal position.

What I claim is:

1. In a computing scale, the combination of a weighing frame, two or more computing cylinders the one within the other, and means operated by the weighing frame for rotating said cylinders separately and in succession.

2. In a computing scale, the combination of a weighing frame, two or more computing cylinders, the one within the other, pinions on said cylinders, racks adapted to engage said cylinders separately and in succession, and connections between said racks and said weighing frame.

3. In a computing scale, the combination of a weighing frame, two or more computing cylinders, the one within the other, pinions connected to said cylinder, a movable bar, racks on said bar, the one above the other, adapted to engage said pinions separately and in succession, and connections between said bar and said weighing frame.

4. In a computing scale, the combination of a weighing frame, two or more computing cylinders, the one within the other, means operated by said frame for rotating said cylinders separately and in succession, and means for locking each of said cylinders.

5. In a computing scale, the combination of a weighing frame, two or more computing cylinders, the one within the other, pinions connected to said cylinders, movable bars at opposite ends of said cylinders, having rack faces arranged at different heights on said bars engaging said pinions, and connections between said bars and said weighing frame.

6. In a computing scale, the combination of a weighing frame, two or more computing cylinders, the one within the other, means operated by said frame for rotating said cylinders separately and in succession, and automatic means for locking the cylinders after having completed a revolution.

7. In a computing scale, the combination of a weighing frame, two or more computing cylinders, one within the other, means operated by said frame for rotating said cylinders separately and in succession, and locking pawls for said cylinders.

8. In a computing scale, the combination of a weighing frame, two or more computing cylinders, the one within the other, pinions connected to said cylinders, racks engaging said pinions separately and in succession, connections between said rack and said weighing frame, and locking pawls engaging said pinions.

9. In a computing scale, the combination of a weighing frame, two or more computing cylinders, the one within the other, pinions connected to said cylinders, racks engaging said pinions separately and in succession, connections between said racks and said weighing frame, said pinions having flanges with notches formed therein, and pawls engaging said notches.

10. In a computing scale, the combination of a weighing frame, two or more computing cylinders, the one within the other, means for rotating said cylinders separately and in succession, connections between said means and the weighing frame, a rotary wheel, a weighted arm connected thereto, connections between said weighing frame and said wheel to rotate the same.

11. In a computing scale, the combination of a weighing frame, two or more computing cylinders, the one within the other, means for rotating said cylinders separately and in succession, connections between said means and said weighing frame, a rotary toothed wheel, a weighted arm connected to said wheel, a rack-bar engaging said wheel, connections between said rack-bar and said weighing frame.

12. In a computing scale, the combination of a weighing frame, two or more computing cylinders, the one within the other, means for rotating said cylinders separately and in succession, connections between said means and said weighing frame, a wheel having teeth on a portion of its periphery, a weighted arm carried by said wheel, a rack-bar engaging said wheel, connections between said rack-bar and said weighing frame.

13. In a computing scale, the combination of a weighing frame, two or more computing cylinders, the one within the other, means for rotating said cylinders separately and in succession, connections between said means and the weighing frame, wheels having teeth on a portion of their periphery, rack-bars adapted to engage said wheels in succession carried by said wheels and connections between said rack-bars and said weighing frame.

14. In a computing scale, the combination of a weighing frame, two or more computing cylinders, the one within the other, means for rotating said cylinders separately and in succession, connections between said means and the weighing frame, rotary wheels having teeth on a portion of their peripheries, rack-bars engaging said wheels in succession, weighted arms carried by said wheels, and means for locking one of said wheels.

15. In a computing scale, the combination of a weighing frame, two or more computing cylinders, the one within the other, means for rotating said cylinders separately and in succession, connections between said means and the weighing frame, wheels having teeth on a portion of their peripheries, weighted arms connected to said wheels, rack-bars adapted to engage said wheels in succession, connections between said rack-bars and said weighing frame, an arm carried by said weighted arm, said arm having a notch therein, and a pin adapted to be engaged by said notch.

16. In a computing scale, the combination of a weighing frame, two or more computing cylinders, the one within the other, means for rotating said cylinders separately and in succession, connections between said means and the weighing frame, wheels having teeth on a portion of their peripheries, weighted arms connected to said wheels, racks adapted to engage said wheels in succession, connections between said racks and said weighing frame, means for locking one of said wheels, and automatic means for releasing the same.

In testimony whereof, I, the said ALBERT F. JOHNSON, have hereunto set my hand.

ALBERT F. JOHNSON.

Witnesses:
F. WARREN KAY,
WM. A. STEINMEYER.